June 10, 1941.   J. R. PROCTOR   2,245,298

METHOD OF WELDING METALLIC BUNGS TO METALLIC DRUMS

Filed Sept. 15, 1938

Inventor
John R. Proctor,
By Richard L. Underwood
Attorney

Patented June 10, 1941

2,245,298

UNITED STATES PATENT OFFICE 2,245,298

METHOD OF WELDING METALLIC BUNGS TO METALLIC DRUMS

John R. Proctor, Bayonne, N. J.

Application September 15, 1938, Serial No. 230,126

7 Claims. (Cl. 219—10)

This invention relates to a method of welding a flange to a drum head sheet in such manner as to form a fluid-tight joint between the two and one wherein rotation of the flange with reference to the drum head is substantially impossible.

Among the objects of the invention is to accomplish the above described desiderata at a minimum cost for welding current and labor time, and to render the process available wherever normal commercial electric current is available, eliminating the need for a high k. v. a. capacity.

A further object of the invention is to produce a welded joint between a flange and drum head sheet which is neat and attractive from a commercial standpoint, eliminating all visible trace of the flash metal which inevitably results from a welded joint. Elimination of all visible trace of the flash metal avoids any need for an extra production step of grinding off such flash, or removing it in some other way.

Another object of the invention is to automatically so time the welding step that a minimum of current is necessary to effect the complete weld, thus reducing the current consumption.

Still a further object of the invention is to so construct the flange and the head of the drum to which it is to be welded that the two cooperate to permit rapid positioning of the flange prior to closing the weld circuit through the dies, and at the same time so concentrate the weld current that an effective weld is produced in a minimum of time, eliminating waste current and at the same time obtaining a most effective weld.

Various other objects and meritorious features of the invention will be apparent from the following description taken in conjunction with the drawing, wherein like numerals refer to like parts throughout the several figures, and wherein.

Figure 1:
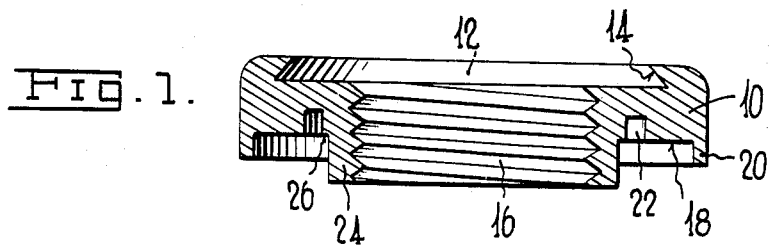
Figure 1 is a sectional elevation of my improved flange.

Referring now to the drawing, the numeral 10 represents a bung flange having a recess or seat 12 in the upper surface thereof, which recess terminates in an undercut or cleft 14 forming an interlock for a seal cap which constitutes no portion of the present invention. The opening in the bung is internally threaded as indicated at 16 to receive a threaded plug.

On the under face of the flange is an annular recess 18 which provides a marginal circumferential skirt 20 extending around the lower edge of the flange. An annular weld race 22 opens into recess 18, the weld race being offset somewhat from the outer wall 24 of the bung as indicated at 26.

Figure 2:
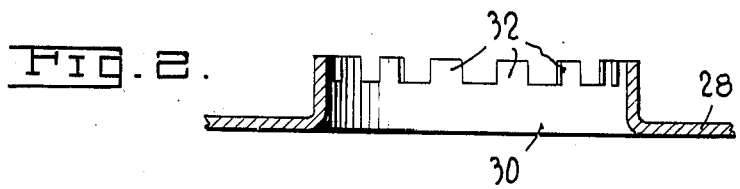
Fig. 2 is a sectional elevation through the apertured drum head sheet formed to receive the flange.
Figure 3:
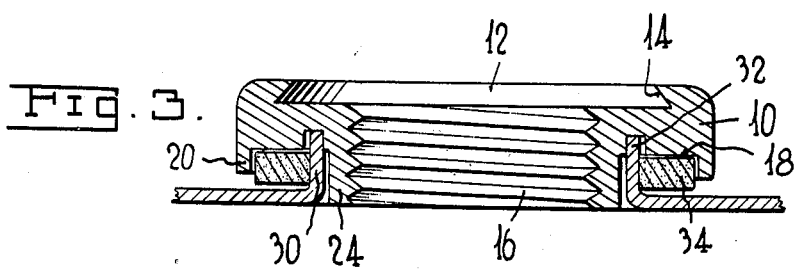
Fig. 3 is a sectional elevation of the flange positioned upon the drum head sheet ready for welding.

Referring now to Fig. 2, the numeral 28 represents the drum head sheet provided with an opening surrounded by a collar 30 having a series of projections 32 formed along its upper edge. This structure is preferably obtained by first aperturing the drum head sheet with some suitable form of die mechanism, subsequently forming the projections 32 around the edge of the opening, and then drawing the collar 30 by suitable means. Whether a single die mechanism is used to perform this series of operations or whether several die mechanisms are used is immaterial insofar as this invention is concerned.

The flange is then positioned and centered with reference to the opening in the drum head sheet by dropping the weld race over the collar 30. It will be apparent that this simple and effective means of centering the flange with reference to the opening eliminates any possible wastage resulting from improper centering prior to performing the weld operation and requires a minimum of time without the necessity for any skill or supplemental centering tools, dies, etc.

Prior to centering the flange an annular gasket 34 is positioned around collar 30. This gasket is composed of electric insulating material, yieldable to a certain extent but substantially resistant to compression. A rather dense asbestos fiber composition has been found suitable for this purpose.

Figure 4:
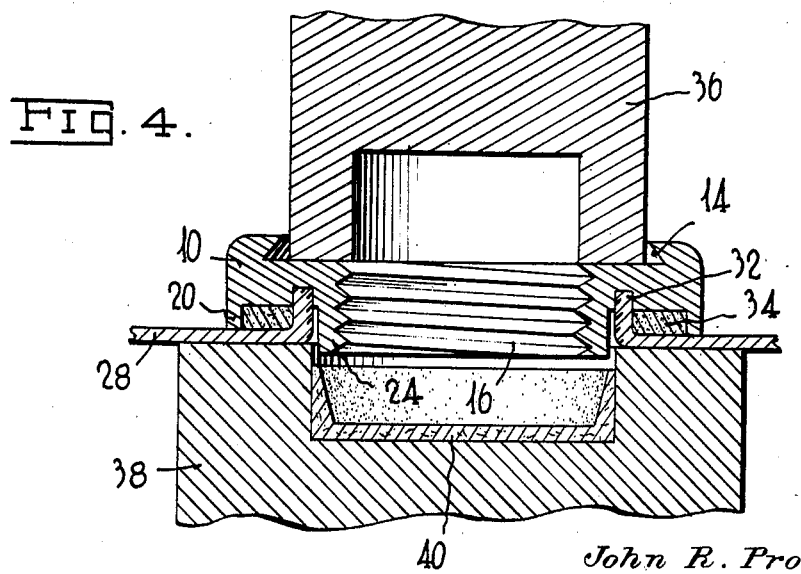
Fig. 4 is a sectional elevation of the completed weld joint.

The gasket 34 is of a size to be received within recess 18, as indicated in Fig. 4, when the flange is positioned in the opening in the drum head sheet. By reason of the offset 26 separating the weld race from the outer wall of the bung, the only metal-to-metal contact between the flanged bung and the drum head sheet and collar when the two are first associated is at the tips of projections 32 which support and center the flange.

Upper and lower weld dies 36 and 38 are then brought into play, forcing the flange down against the resistance of the gasket 34 to compress the same. The circuit through the weld dies is opened before the extremity of skirt 20 comes in contact with the drum head sheet as indicated in Fig. 4. The weld current is so concentrated through the projections 32 and the weld race in which they are seated that the weld joint is completed before skirt 20 of the flange comes in contact with the sheet, although the dies continue to operate until such contact is made and the gasket is completely sealed within recess 18 in the flange.

The metal of projections 32 flows circumferentially and evenly within the race during the weld operation and the flash metal is completely sealed within the race on completion of the operation. The gasket 34 is sealed within recess 18 to form a leak-proof joint between the flange and sheet.

It is to be noted that a cup 40, which may be of fibrous or other non-conducting material, is seated within the recess in lower weld die 38 for the purpose of catching any flash metal which might drop down along the outer wall 24 of the bung during the weld operation, thus insuring maximum efficiency of the weld dies over an extended period of time. The cup may be removed at intervals and its contents eliminated before replacement within the lower die cavity. Otherwise, some flash metal might pile up within the cavity and progressively diminish the efficiency of the weld by deconcentrating the current through the projections in the weld race.

The known advantages inherent in a projection weld as distinguished from a continuous surface weld are inherent in the structure described. This weld requires a current of approximately thirty-five per cent of what would be required in current consumption as compared with a continuous ring projection instead of the separate projections as shown on the drawing, and the time required to complete a weld is from forty to one hundred cycles depending on the characteristics of the steel. Thus it is apparent that the weld current may be so timed that the circuit is opened before the skirt touches the drum sheet to short-circuit the current during the compression stroke of the dies. The current required is easily accessible for commercial purposes and the necessary k. v. a. capacity is relatively small.

Having described a preferred embodiment of my method and its resultant structure, various modifications will be apparent to those skilled in the art, and for that reason I wish to limit myself only within the scope of the appended claims.

What I claim is:

1. A method of welding a metallic bung having a main portion and a right angularly extending flange portion to a metallic collar surrounding an opening in a metallic drum, the collar having a plurality of outwardly extending serrations along its edge and the flange portion of the bung having an underlying groove adapted to receive said collar and of a width substantially equal to the thickness thereof, the said groove being slightly spaced from the main portion of the bung, comprising the steps of inserting the main portion of the bung into the opening and seating the collar in the groove of the flange so that the serrations on the collar are in contact with the flange in the groove thereof and the main portion of the bung is spaced from the collar, and passing an electric welding current serially through the flanged bung and serrated collar while applying pressure to the upper face of the bung and the under face of the drum surrounding the opening to weld the collar to the flanged bung within the groove therein.

2. A method of welding a metallic bung having a main portion and a right angularly extending flange portion to a metallic collar surrounding an opening in a metallic drum, the collar having a plurality of outwardly extending serrations along its edge and the flange portion of the bung having an underlying groove, the inner dimension of which is substantially equal to the inner dimension of the collar and the outer dimension of which is slightly larger than the outer dimension of the collar, comprising the steps of inserting the main portion of the bung into the opening and seating the collar in the groove of the flange so that the serrations on the collar are in contact with the flange in the groove thereof, and passing an electric welding current serially through the flanged bung and serrated collar while applying pressure to the upper face of the flanged bung and the under face of the drum surrounding the opening to weld the collar to the flanged bung within the groove therein.

3. A method of welding a metallic bung having a main portion and a right angularly extending flange portion to a metallic collar surrounding an opening in a metallic drum, the collar having a plurality of outwardly extending serrations along its edge and the flange portion of the bung having an underlying groove, the inner dimension of which is substantially equal to the inner dimension of the collar and the outer dimension of which is slightly larger than the outer dimension of the collar, the said groove being slightly spaced from the main portion of the bung, comprising the steps of inserting the main portion of the bung into the opening and seating the collar in the groove of the flange so that the serrations on the collar are in contact with the flange in the groove thereof and the main portion of the bung is spaced from the collar, and passing an electric welding current serially through the flanged bung and serrated collar while applying pressure to the upper face of the flanged bung and the under face of the drum surrounding the opening to weld the collar to the flanged bung within the groove therein.

4. A method of welding a metallic bung having a main portion and a right angularly extending flange portion to a metallic collar surrounding an opening in a metallic drum, the collar having a plurality of outwardly extending serrations along its edge and the flange portion of the bung having an underlying groove adapted to receive said collar and of a width substantially equal to the thickness thereof, said flange portion of the bung having also a second underlying groove positioned radially outwardly from said collar-receiving groove and adapted to receive a gasket, comprising the steps of seating a compressible dielectric gasket in said second groove to project therebelow, inserting the main portion of the bung into the opening and seating the collar in the groove of the flange so that the serrations on the collar are in contact with the flange in the groove thereof, passing an electric welding current serially through the flanged bung and serrated collar while applying pressure to the upper face of the flanged bung and the under face of the drum surrounding the opening to weld the collar to the flanged bung within the groove therein and to compress the gasket between the flange and drum, opening the welding current circuit before the wall of said second groove contacts the metal surrounding the collar, and continuing so to apply pressure until such contact is made.

5. A method of welding a metallic bung having a main portion and a right angularly extending flange portion to a metallic collar surrounding an opening in a metallic drum, the collar having a plurality of outwardly extending serrations along its edge and the flange portion of the bung having an underlying groove adapted to receive said collar and of a width substantially equal to the thickness thereof, the said groove being slightly spaced from the main portion of the bung, said flange portion of the bung having also a second underlying groove positioned radially outwardly from said collar-receiving groove and adapted to receive a gasket, comprising the steps of seating a compressible dielectric gasket in said second groove to project therebelow, inserting the main portion of the bung into the opening and seating the collar in the groove of the flange so that the serrations on the collar are in contact with the flange in the groove thereof and the main portion of the bung is spaced from the collar, passing an electric welding current serially through the flanged bung and serrated collar while applying pressure to the upper face of the flanged bung and the under face of the drum surrounding the opening to weld the collar to the flanged bung within the groove therein and to compress the gasket between the flange and drum, opening the welding current circuit before the wall of said second groove contacts the metal surrounding the collar, and continuing so to apply pressure until such contact is made.

6. A method of welding a metallic bung having a main portion and a right angularly extending flange portion to a metallic collar surrounding an opening in a metallic drum, the collar having a plurality of outwardly extending serrations along its edge and the flange portion of the bung having an underlying groove slightly spaced from the main portion of the bung, said flange portion of the bung having also a second underlying groove positioned radially outwardly from said collar-receiving groove and adapted to receive a gasket, comprising the steps of seating a compressible dielectric gasket in said second groove to project therebelow, inserting the main portion of the bung into the opening and seating the collar in the groove of the flange so that the serrations on the collar are in contact with the flange in the groove thereof and the main portion of the bung is spaced from the collar, passing an electric welding current serially through the flanged bung and serrated collar while applying pressure to the upper face of the flanged bung and the under face of the drum surrounding the opening to weld the collar to the flanged bung within the groove therein and to compress the gasket between the flange and drum, opening the welding current circuit before the wall of said second groove contacts the metal surrounding the collar, and continuing so to apply pressure until such contact is made.

7. A method of welding a metallic bung having a main portion and a right angularly extending flange portion to a metallic collar surrounding an opening in a metallic drum, the collar having a plurality of outwardly extending serrations along its edge and the flange portion of the bung having an underlying groove, the inner dimension of which is substantially equal to the inner dimension of the collar and the outer dimension of which is slightly larger than the outer dimension of the collar, the said groove being slightly spaced from the main portion of the bung, said flange portion of the bung having also a second underlying groove positioned radially outwardly from said collar-receiving groove and adapted to receive a gasket, comprising the steps of seating a compressible dielectric gasket in said second groove to project therebelow, inserting the main portion of the bung into the opening and seating the collar in the groove of the flange so that the serrations on the collar are in contact with the flange in the groove thereof and the main portion of the bung is spaced from the collar, passing an electric welding current serially through the flanged bung and serrated collar while applying pressure to the upper face of the flanged bung and the under face of the drum surrounding the opening to weld the collar to the flanged bung within the groove therein and to compress the gasket between the flange and drum, opening the welding current circuit before the wall of said second groove contacts the metal surrounding the collar, and continuing so to apply pressure until such contact is made.

JOHN R. PROCTOR.